(12) United States Patent
Garthwaite et al.

(10) Patent No.: US 8,583,875 B1
(45) Date of Patent: Nov. 12, 2013

(54) EFFICIENT READABLE BALLOONING OF GUEST MEMORY BY BACKING BALLOON PAGES WITH A SHARED PAGE

(75) Inventors: Alexander Thomas Garthwaite, Beverly, MA (US); Yury Baskakov, Newton, MA (US)

(73) Assignee: VMware, Inc., Palo Alto, CA (US)

( * ) Notice: Subject to any disclaimer, the term of this patent is extended or adjusted under 35 U.S.C. 154(b) by 618 days.

(21) Appl. No.: 12/835,303

(22) Filed: Jul. 13, 2010

(51) Int. Cl.
G06F 12/00 (2006.01)

(52) U.S. Cl.
USPC .................. 711/147; 711/6; 711/E12.002

(58) Field of Classification Search
USPC .................. 711/147, 6, E12.002
See application file for complete search history.

(56) References Cited

U.S. PATENT DOCUMENTS

| | | | |
|---|---|---|---|
| 5,493,663 A | 2/1996 | Parikh | |
| 5,606,685 A | 2/1997 | Frandeen | |
| 6,202,127 B1 | 3/2001 | Dean et al. | |
| 6,496,912 B1 | 12/2002 | Fields, Jr. et al. | |
| 6,789,156 B1 | 9/2004 | Waldspurger | |
| 7,412,492 B1 | 8/2008 | Waldspurger | |
| 7,421,533 B2 | 9/2008 | Zimmer et al. | |
| 7,433,951 B1 * | 10/2008 | Waldspurger | 709/226 |
| 7,472,252 B2 | 12/2008 | Ben-Zvi | |
| 7,500,048 B1 | 3/2009 | Venkitachalam et al. | |
| 7,640,543 B2 | 12/2009 | Vij et al. | |
| 7,702,843 B1 | 4/2010 | Chen et al. | |
| 7,716,446 B1 | 5/2010 | Chen et al. | |
| 7,797,699 B2 | 9/2010 | Kagi et al. | |
| 7,870,153 B2 | 1/2011 | Croft et al. | |
| 7,886,126 B2 | 2/2011 | Bennett et al. | |
| 8,095,931 B1 | 1/2012 | Chen et al. | |
| 2010/0241785 A1 * | 9/2010 | Chen et al. | 711/6 |

OTHER PUBLICATIONS

C. A. Waldspurger, "Memory Resource Management in VMware ESX Server," Proceedings of the 5th Symposium on Operating Systems Design and Implementation (OSDI 2002), ACM Operating Systems Review, pp. 181-194, Dec. 2002.

* cited by examiner

*Primary Examiner* — Larry Mackall

(57) ABSTRACT

Methods, systems, and computer programs for managing physical memory in a host of a virtual infrastructure are presented. One method includes an operation for detecting that a guest physical page (GPP) of a virtual machine (VM) is a balloon page. The GPP, previously mapped to a machine page (MP), is re-mapped to a shared page of memory in order to free the MP, such that a read to the GPP causes a read to the shared page of memory. Further, the method includes an operation for detecting a write to the shared page of memory after the re-mapping of the GPP to the shared page, where the write to the shared page is caused by a write to the GPP. After detecting the write, all balloon pages created by the VM are reset in order to reset the balloon application in the VM.

23 Claims, 8 Drawing Sheets

EFFICIENT READABLE BALLOONING OF GUEST MEMORY BY BACKING BALLOON PAGES WITH A SHARED PAGE

CROSS REFERENCE TO RELATED APPLICATIONS

This application is related to U.S. Pat. No. 7,716,446, filed Sep. 21, 2006, and entitled "SYSTEM AND METHOD FOR COOPERATIVE VIRTUAL MACHINE MEMORY SCHEDULING"; U.S. patent application Ser. No. 12/729, 428, filed Mar. 23, 2010, and entitled "MANAGEMENT OF HOST PHYSICAL MEMORY ALLOCATION TO VIRTUAL MACHINES WITH A BALLOON APPLICATION"; U.S. Pat. No. 7,702,843, filed on Sep. 21, 2006, and entitled "DETERMINING MEMORY CONDITIONS IN A VIRTUAL MACHINE"; U.S. patent application Ser. No. 12/826, 389, filed Jun. 29, 2010, and entitled "COOPERATIVE MEMORY RESOURCE MANAGEMENT VIA APPLICATION-LEVEL BALLOON", which are all incorporated herein by reference.

1. FIELD OF THE INVENTION

The present invention relates to methods for managing memory in a host, and more particularly to methods, systems and computer programs for cooperative memory management via virtual machine balloons.

2. DESCRIPTION OF THE RELATED ART

Virtual computing environments allow multiple virtual machines (VMs) to run on a single physical host and to share physical resources. Typically, a virtualization infrastructure running on the host allocates a certain amount of "physical" memory for use by each VM running on the physical host. However, a VM's physical memory is actually a software abstraction used by the virtualization infrastructure to provide the illusion of actual hardware memory available to the VM (referred to herein as "machine" memory). To the extent that a VM requires use of certain memory pages of its allocated physical memory, the virtualization infrastructure maps its physical memory pages to actual machine memory pages of the physical host. This level of abstraction enables the virtualization infrastructure to configure the VMs in a way where the amount of "physical" memory allocated to each VM, in the aggregate, is greater than the amount of actual "machine" memory available on the host. This is referred to as memory over-commitment, and it allows packing more VMs onto a single host.

Memory over-commitment is one of the key benefits of virtualization. In some implementations, if a VM is not using all the machine memory allocated to its physical memory, the VM is charged an idle tax so some of such machine memory is taken away from the VM and made available to others VMs or other processes in the host. VMs may also make use of (buffer) caches and free-lists of pages that are easily reclaimable. Further, guest operating systems often provide a mechanism to page out memory.

To achieve over-commitment, the virtual infrastructure gives a VM less machine memory than what the guest operating system (OS) in the VM believes it has (e.g., as VM physical memory). One technique for doing this is to use what is called a balloon application. A balloon application is a resource reservation application that runs as a guest application in the VM and that requests memory from the guest operating system. By reserving memory, the balloon application assists with the reclamation of machine memory by the virtual infrastructure. In some implementations, the balloon application is a driver or module installed in the guest OS to facilitate communications with the virtual infrastructure. In other implementations, a balloon application may be considered a guest application that interacts with such a driver.

Another mechanism for memory management is called swapping, where the virtual infrastructure transparently unmaps (i.e., takes away) machine memory pages from the guest OS, swaps the content to disk, and swaps the pages back to into machine memory if the guest OS accesses these pages. Both ballooning and swap may impact the performance of applications inside the guest, since there is less machine memory to use. However, as long as an application's active working set fits into the VM's memory share, the application will not suffer significant performance loss.

While the guest physical memory pages allocated to a balloon module are typically not accessed by the rest of the VM's guest operating system (e.g., since the balloon module has reserved such physical memory pages for its own "use" but, in reality, has no need to actually access such physical memory pages), there do arise situations during the life cycle of a guest operating system when such guest physical memory pages might be accessed. For example, a guest operating system may reboot or otherwise reset the allocation of physical memory without the knowledge of the virtual infrastructure. In such situations, the physical memory pages allocated to the balloon application (as well as other running processes and applications) are released and reset by the guest operating system, thereby freeing such guest physical memory pages (and thus the correspondingly mapped machine memory pages) to be allocated to and used by another process running in the VM. Similarly, other processes running in the guest operating system may sometimes access guest physical memory pages allocated to the balloon application. Examples of such processes include the examination of guest physical memory (/dev/mem or /dev/kmem on linux) to locate lost editor buffers, a virus scan that examines all VM memory for signs of infection, a random-number-generator that performs random memory reads, and the like. Currently, when a guest physical memory page allocated to a balloon is reset or otherwise accessed as described above, the virtual infrastructure reallocates a new machine page memory back to the physical memory page.

SUMMARY

Embodiments of the present invention provide methods, systems, and computer programs for managing machine memory in a host of a virtual infrastructure. Balloon pages are mapped to a readable shared page in host machine memory, allowing applications in a virtual machine (VM) to perform memory reads on the balloon pages.

It should be appreciated that the present invention can be implemented in numerous ways, such as a process, an apparatus, a system, a device or a method on a computer readable medium. Several inventive embodiments of the present invention are described below.

In one embodiment, a method includes an operation for detecting that a guest physical page (GPP) of a VM is a balloon page. The GPP, previously mapped to a machine page (MP), is re-mapped to a shared page of memory in order to free the MP, such that a read to the GPP will cause a read to the shared page of memory. Further, the method includes an operation for detecting a write to the shared page of memory after the re-mapping of the GPP to the shared page, where the write to the shared page is caused by a write to the GPP. After detecting the write, all balloon pages created by the VM are reset in order to reset the balloon application in the VM. In another embodiment, a computer program, when executed by one or more processors, performs the method operations.

In yet another embodiment, a system for managing machine memory in a host includes machine memory, a balloon application, and a resource scheduler. The machine memory includes MPs, and the balloon application executes in a VM. Further, the balloon application obtains GPPs from the operating system (OS) executing in the VM. The resource scheduler performs operations for detecting GPPs reserved by the balloon application that are balloon pages, where the GPPs are mapped to corresponding MPs. The resource scheduler also re-maps each balloon page that was detected to a shared page of memory in order to free the corresponding MPs, where a read to any balloon page causes a read to the shared page of memory. In addition, the resource scheduler detects a write to the shared page of memory after the re-mapping, the write to the shared page being caused by a write to a balloon page, and the resource scheduler resets all the balloon pages when the write to the shared page is detected.

In yet another embodiment, a method for managing machine memory in a host of a virtual infrastructure includes an operation for detecting that a GPP of a VM is a balloon page, where the GPP is mapped to an MP. The GPP is mapped with some special identifier for an invalid mapping to a machine page in order to free the MP, such that the GPP is not mapped to any MP. The method further includes an operation for re-mapping the GPP to a shared page of memory upon detecting a read to the GPP if the GPP is not already mapped to the shared page, where the read to the GPP causes a read to the shared page of memory. In another operation, the method detects a write to the shared page of memory caused by a write to the GPP. All balloon pages created by the VM are then reset when the write to the shared page is detected.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe methods, systems, and computer programs for managing machine memory in a host of a virtual infrastructure. One method includes an operation for detecting that a guest physical page (GPP) of a virtual machine (VM) is a balloon page. The GPP, previously mapped to a machine page (MP), is re-mapped to a shared page of machine memory in order to free the MP, such that a read to the GPP causes a read to the shared page of memory. For example, in some x64 implementations, the re-mapping takes place via a hypercall, using an IN or OUT instruction to access some predefined special port or syscall entry point. Further, the method includes an operation for detecting a write to the shared page of machine memory after the re-mapping of the GPP to the shared page, where the write to the shared page is caused by a write to the GPP. After detecting the write, all balloon pages created by the VM are reset in order to reset the balloon application in the VM.

It will be obvious, however, to one skilled in the art, that the present invention may be practiced without some or all of these specific details. In other instances, well known process operations have not been described in detail in order not to unnecessarily obscure the present invention.

Figure 1:
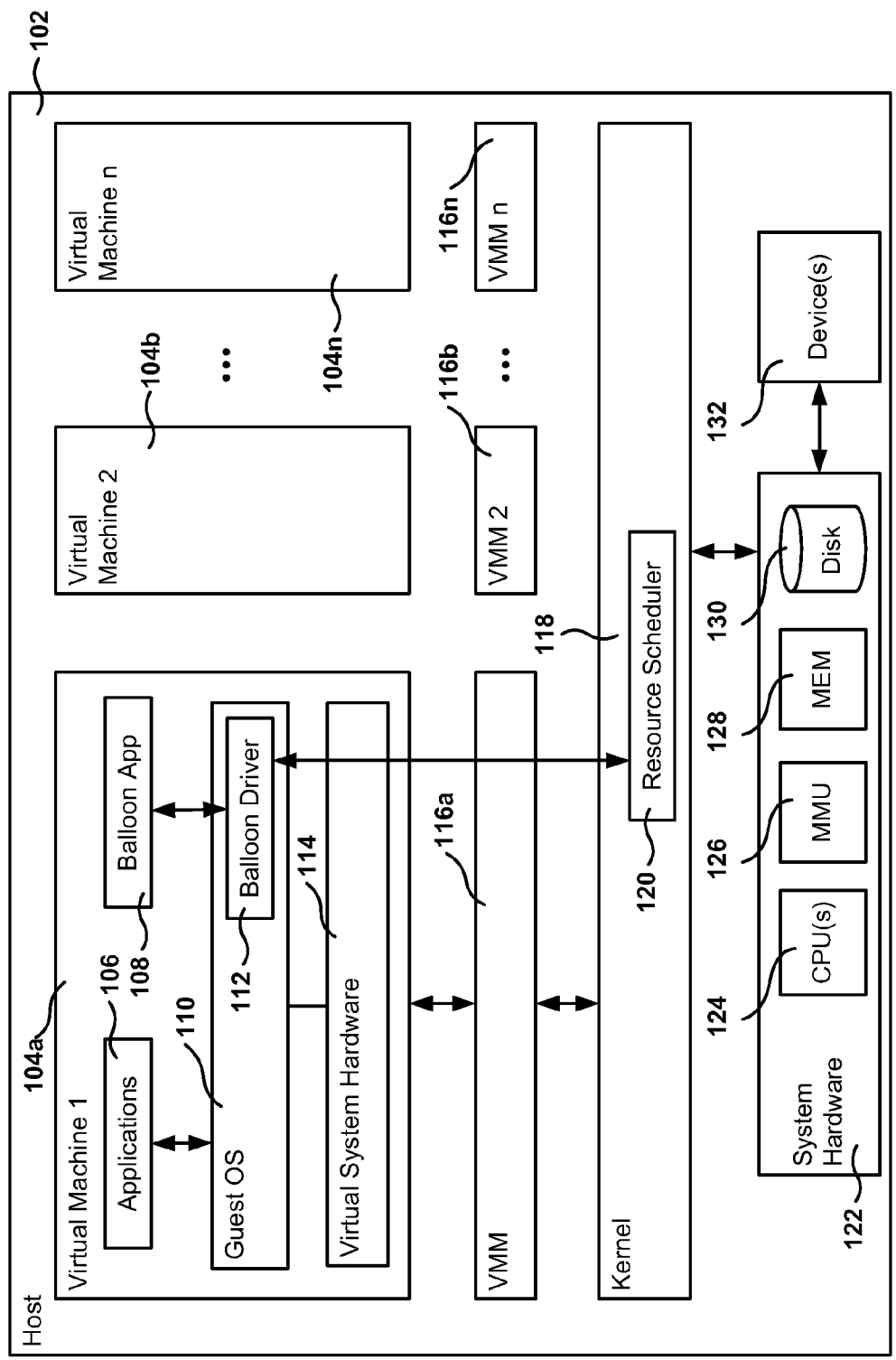
FIG. 1 illustrates a balloon application executing in a virtual machine, according to one embodiment.

FIG. 1 illustrates a balloon application executing in a virtual machine, according to one embodiment of the present invention. It should be noted that some embodiments described below are described in reference to a balloon application executing as a guest application in the VM, but other embodiments may also implement the balloon application as a driver or module within the guest operating system of the VM, or with both a separate driver and guest application cooperating in the VM (e.g., the embodiment of FIG. 1), as long as the principles taught herein are preserved. The embodiments presented should therefore not be interpreted to be exclusive or limiting, but rather exemplary or illustrative. VM 104a, also referred to herein as guest, is installed on host 102, which includes system hardware 122 and one or more layers or co-resident components comprising system-level software, such as an operating system (OS) or similar kernel, a virtual machine monitor (VMM) 116a or a hypervisor, or some combination of these. System hardware 122 includes one or more CPUs 124, memory manager unit 126, some form of memory 128 (volatile or non-volatile), one or more storage devices such as one or more disks 130, and one or more devices 132, which may be integral or separate and removable.

Each VM 104a-104n typically mimics the general structure of a physical computer, and as such, each VM usually has both virtual system hardware 114 and guest system software. All of the virtual hardware components of the VM may be implemented in software to emulate corresponding physical components. The guest system software includes a guest operating system (OS) 110 and drivers as needed, for example balloon driver 112 for implementing communications between balloon application 108 and resource scheduler 120 in kernel 118. In some embodiments, the resource scheduler is split between the VMM 116a and kernel 118. The part of the resource scheduler in each VM determines each VM's overall target and the part of the resource scheduler in kernel 118 passes on the specific policy settings to each guest. If VM 104a is properly designed, applications 106 running on the VM will function essentially as they would if run on a "real" computer.

Some interface is generally required between the guest software within a VM and the various hardware components and devices in the underlying hardware platform. This interface—which may be referred to generally as "virtualization software" or "virtualization layer"—may include one or more software components or layers, possibly including one or more of the software components known in the field of virtual machine technology as VMMs 116a-116n, hypervisors, or virtualization kernels 118.

By way of illustration and example only, the figures show each VM running on a corresponding virtual machine monitor. The description's reference to VMMs is also merely by way of common example. A VMM is usually a software component that virtualizes at least one hardware resource of some physical platform, so as to export a hardware interface to the VM corresponding to the hardware the VM "thinks" it is running on. As FIG. 1 illustrates, a virtualized computer system may have more than one VM, each of which may be running on its own VMM.

In the embodiment of FIG. 1, balloon application 108 executes as a guest application on VM 104a. According to one embodiment, the balloon application 108 executes as a user-level application. Balloon application 108 is not privileged, and therefore cannot typically reserve arbitrary amounts of guest physical memory. In another embodiment, the balloon application 108 executes with special permissions, for example by running in kernel mode, which enables performing certain actions not ordinarily permitted by user-level applications.

In one embodiment, the guest OS 110 also includes a balloon driver 112. The balloon driver 112 executes as a device driver within the guest operating system 110 and is capable of performing certain privileged actions. For example, the balloon driver 112 may be able to reserve guest physical memory, to perform input/output instructions, to write to protected areas of guest physical memory, and to modify page tables. The balloon driver 112 may also be capable of performing other actions typically performed by operating system device drivers.

According to one embodiment, the balloon application 108 sends messages to the balloon driver 112. The balloon application 108 may send messages to the balloon driver 112 using a variety of methods. For example, the balloon application 108 can open a handle to a device managed by the balloon driver 112. In a typical guest operating system 110, system calls to this device will be handled by the balloon driver 112. As another example, the balloon application 108 can make an explicit driver call to the balloon driver 112. Other methods should be recognized without departing from the scope of the teachings herein. For example, as previously discussed, certain embodiments may use just a guest application, while other embodiments may use a guest application and a driver, and yet other embodiments may use just a driver. As such, it should be understood that references herein to a "balloon application" or to "balloon application 108" refer to any of such embodiments of a balloon application (e.g., guest application only, driver only, combination of guest application and driver, and the like).

Outside of VM 104a is resource scheduler 120. For the purposes of illustration, the resource scheduler 120 is shown as being contained in the kernel 118. However, the systems and methods ascribed herein to the resource scheduler 120 may be embodied in other components in the virtualization layer. For example, the resource scheduler 120 can be embodied entirely in the virtual machine monitor 116a. As another example, resource scheduler 120 can be embodied partially in VMM 116a and partially in kernel 118. Other implementations for resource scheduler 120 should be recognized without departing from the scope of the teachings herein.

Resource scheduler 120 manages the assignment of resources to the various virtual machines 104a-104n. One such resource is machine memory. According to one embodiment of the present invention, the resource scheduler 120 monitors VMs' usage of their respective guest physical memories to determine how much machine memory should be allocated to each VM. Resource scheduler 120 may also take into account the relative priorities of the various VMs 104a-104n.

If resource scheduler 120 determines that the amount of machine memory allocated to a virtual machine should be adjusted, the resource scheduler 120 may reclaim the machine memory using a variety of methods. For example, the resource scheduler 120 may page-out some of the machine memory mapped to the guest physical memory of a VM to another storage device, effectively reducing the amount of machine memory allocated to the VM. As another example, the resource scheduler 120 may reclaim some of the machine memory allocated to a virtual machine by using the balloon application 108 to reduce the amount of guest physical memory used by other applications 106. As another example, resource scheduler 120 may reclaim some of the machine memory from the inside of the VM by using a device driver to reduce the amount of guest physical memory used by applications 106. As yet another example, resource scheduler 120 may reclaim the machine memory using any combination of methods described herein or known in the art.

Figure 2:
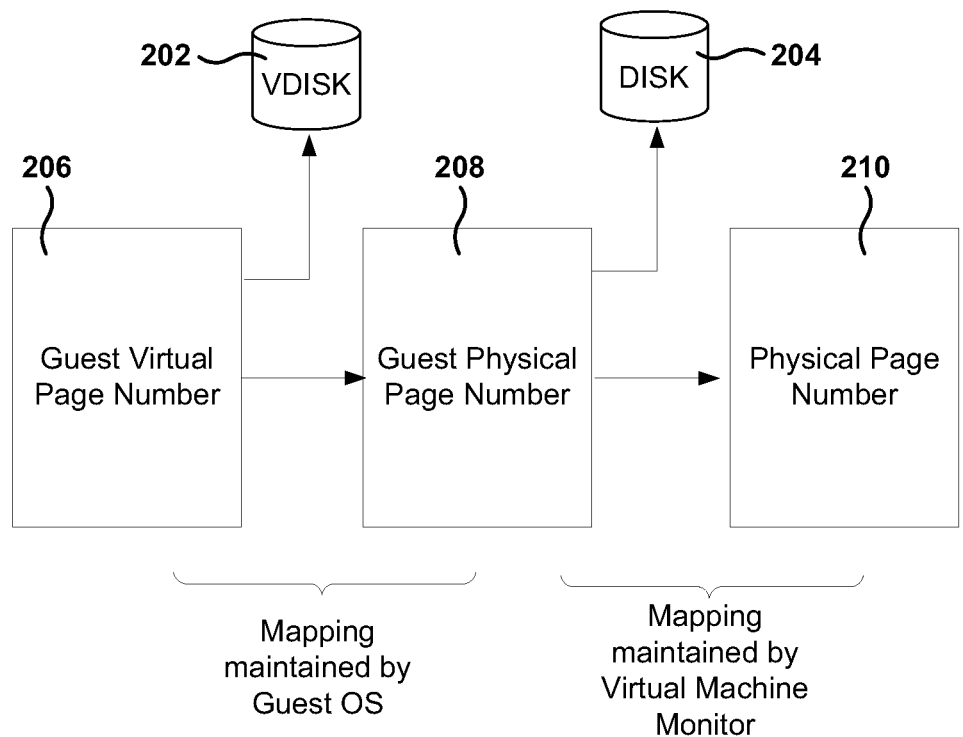
FIG. 2 illustrates a three address space memory mapping, according to one embodiment.

FIG. 2 illustrates a three-level memory address space, according to one embodiment. A memory addressing configuration having three levels of address spaces has been selected for the purposes of illustration as an example of configuration in which embodiments may be usefully implemented. Moreover, the address spaces described herein, specifically, guest virtual memory, guest physical memory, and machine memory, are given for the purposes of illustration and are not limiting. Other configurations and examples of address spaces should be recognized without departing from the scope of the teachings herein.

When multiple address spaces are implemented, different memory addresses (to use a specific example of a "memory location") sometimes refer to the same place in the electronic storage. For example, the same bits in electronic storage may be described by a guest virtual memory address, a guest physical memory address, and a machine memory address. As another example, the same bits in electronic storage may be described by two distinct guest physical memory addresses. The number of addresses referencing a set of bits of electronic storage should not be confused with their innate storage capacity, which is generally fixed.

Typically, the relationships between addresses in one address space and the addresses in another address space are maintained in a page table. A page table is composed of page table entries. Each page table entry maps an address in the first address space to an address in the second address space. These addresses are described using page numbers. Thus, a page table entry might include a page number of a first address space and a corresponding page number of a second address space.

In the example illustrated in FIG. 2, memory addresses for guest virtual pages (GVPs) in the guest virtual memory address space are described by guest virtual page numbers (GVPNs), and memory addresses for guest physical pages (GPPs) in the guest physical memory address space are described by guest physical page numbers (GPPNs). The guest operating system maintains a page table mapping the GVPNs to GPPNs. If a guest virtual memory page has been paged-out, instead of mapping to a GPPN, its page table entry may map to a location on the virtual disk 202 (or may include some other indication that the page is not stored in guest physical memory). For example, a GVPN may be unmapped, i.e., not mapped to either a valid GPPN or a location on virtual disk 202.

Similarly, memory addresses for machine pages (MP) in the machine memory address space are described by machine page numbers (MPNs). The virtual machine monitor (or another component of the virtualization layer) maintains a data structure (such as a page table) mapping the GPPNs to MPNs. If a GPP has been paged-out, instead of mapping to a MPN its page table entry may map to a location on disk 204 (or may include some other indication that the page is stored on disk). As another case, a GPPN may be unmapped, i.e., not mapped, to either a valid MPN or to a location on disk 204.

In the example illustrated, GVPN 206 is mapped to GPPN 208. The mapping of the GVPN 206 is maintained by the guest operating system. Further, the GPPN 208 is mapped to a MPN 210, and the mapping of the GPPN 208 is maintained by the VMM. At each level of memory management abstraction, memory addresses may be treated as if they were tangible memory locations.

Figure 3:
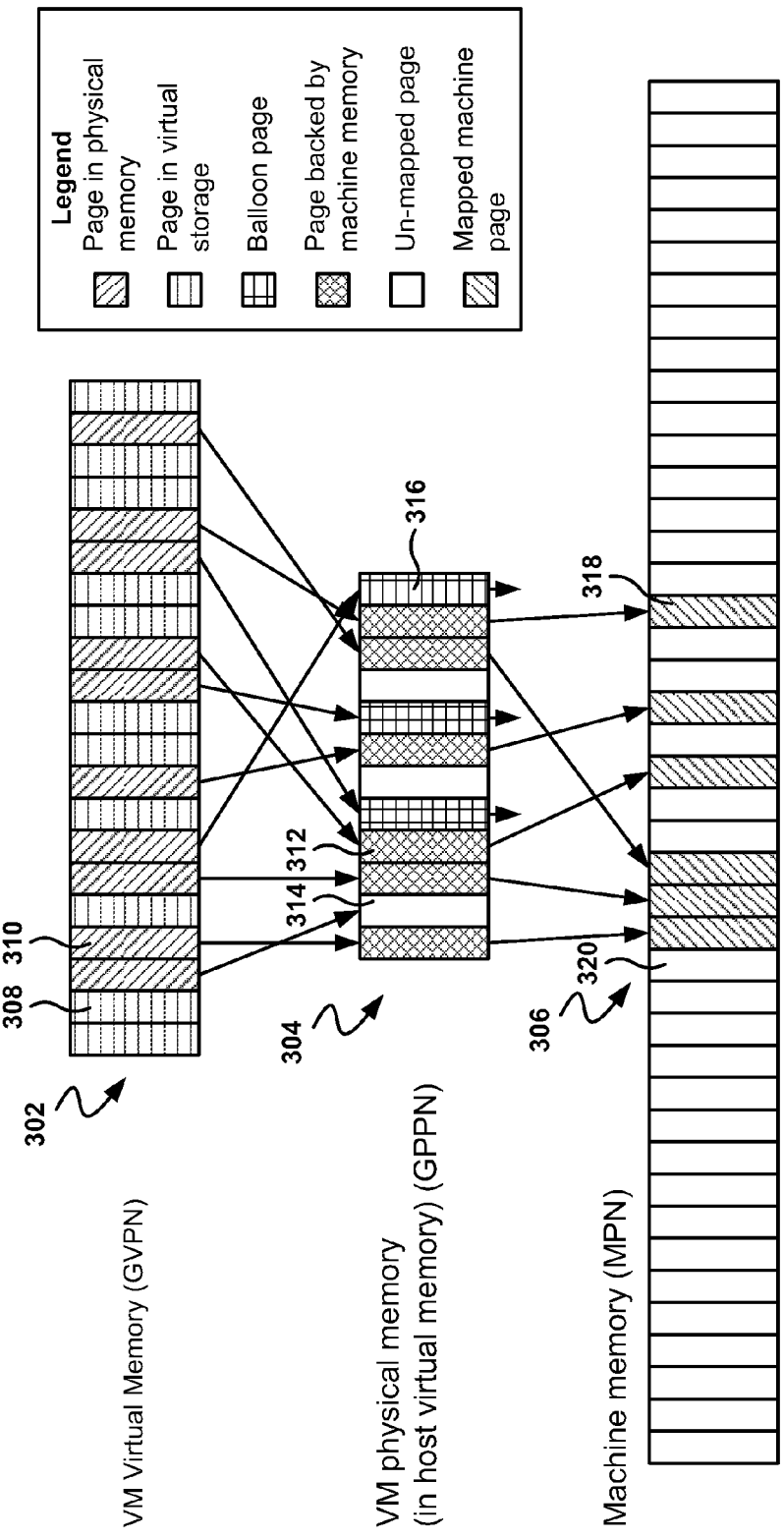
FIG. 3 depicts memory mappings between different levels of memory, according to one embodiment.

FIG. 3 illustrates memory mappings between different levels of memory, according to one embodiment. FIG. 3 further illustrates how the pages of memory at different levels are mapped. At a certain moment in time, GVPN pages 302 can be mapped to a location in virtual storage 308 or to a GPPN 310. The pages in VM physical memory 304 can be either pages that are un-mapped 314 to machine memory, pages that are backed 312 by an actual page in machine memory, or pages that have been "ballooned." The balloon pages are those pages of guest physical memory whose corresponding machine memory pages have been released by the resource scheduler to make such machine memory pages available for use by other VMs or applications executing in the host.

In one embodiment, the balloon pages 316 in guest physical memory are not mapped to any page in machine memory, which is represented in FIG. 3 as an arrow that does not reach a machine memory page in machine memory 306. This is sometimes marked with a special identifier that represents an invalid mapping to a machine page (e.g., INVALID_MPN) to indicate that the balloon pages are not backed by a page of machine memory.

In some systems, any access to a balloon page means trying to access a guest physical page with an invalid mapping to machine memory, which will cause the balloon application to reset. In such systems, resetting the balloon application means identifying all the GPPs from the VM that have been "ballooned" (i.e., given away), releasing them from control of the balloon application and, in certain embodiments, then mapping a machine page for each of the GPPs that have been ballooned. Mapping the machine page can be done at the time that the balloon application is being reset or it can be postponed until some guest operation actually accesses the guest physical page. To cope with guests that have legitimate reasons to read arbitrary memory, some virtualization layers have chosen to track the frequency of such balloon resets, and if the frequency is sufficiently high then the virtualization layer disables the use of ballooning in those guests with a high frequency of memory resets. This forces the resource scheduler to fall back on virtualization layer-level swapping to handle overcommitted VMs that must release memory. In so doing, these VMs lose the benefit of ballooning as a mechanism to constrain memory-usage and the ability to make informed decisions for releasing memory to the platform.

Figure 4:
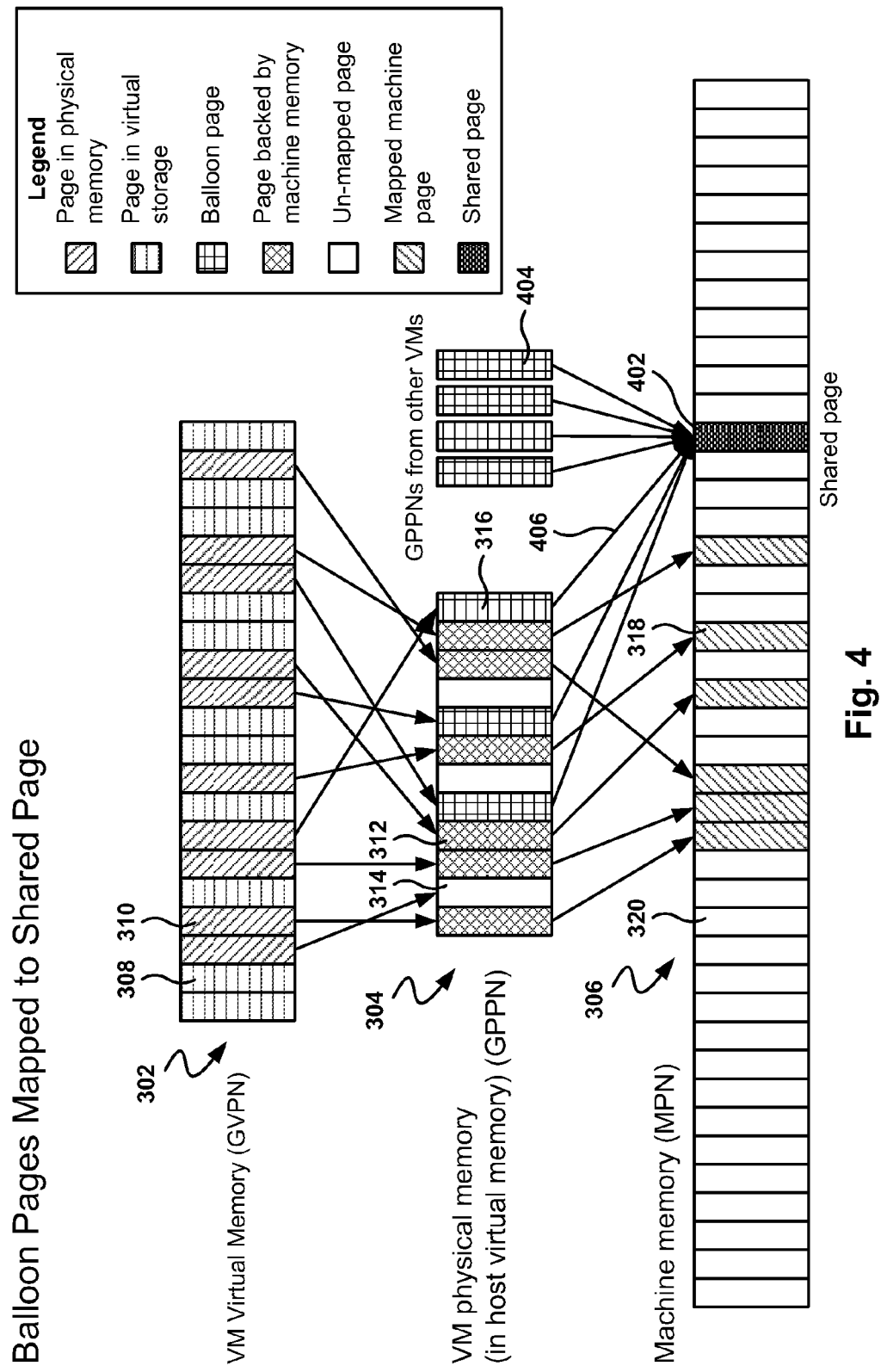
FIG. 4 illustrates memory mappings in the presence of a shared page, according to one embodiment.

FIG. 4 illustrates memory mappings in the presence of a shared page, according to one embodiment. To support read access to balloon pages, embodiments "back" balloon pages with a shared machine memory page 402, that is, the guest physical pages are mapped to a page of machine memory (shared page 402) instead of having an invalid mapping, and the shared machine page can be simultaneously mapped by one or more guest physical pages from one or more VMs. The GPPs do not have to be in the same guest and multiple guests can have GPPs 404 mapped to the shared page. Further, there can be more than one shared page in the host machine memory.

Page sharing is useful for reducing pressure on the need of machine memory. For example, if multiple VMs are running the same version of the operating system, all the VMs need to access the same pages of the operating system. By sharing these OS pages, the VMs can have access to the OS code without needing to have the same page of code loaded in machine memory several times, one for each VM accessing the same page. In one embodiment, shared page 402 is a "zero-page" in machine memory, which is a commonly shared page used, for example, by many memory allocation techniques to initialize newly allocated pages or re-assign pages with a "blank" page of memory (filled with 0 values). For example, if a page of machine memory is reassigned from one VM to another, the OS "zeroes-out" the page before reassigning the page for privacy and security reasons. An easy way to perform this operation is by mapping the guest page to the zero page. When the VM then subsequently tries to write to the zero page (i.e., by writing to a GPP initialized to be mapped to the zero-page), a copy-on-write (COW) operation takes place, whereby the virtualization layer remaps the GPP relating to the write instruction from the zero-page to its own allocated machine page. In general, copy-on-write is an optimization strategy where if multiple callers ask for resources which are initially indistinguishable, the callers can all be given pointers to the same resource. This function can be maintained until a caller tries to modify its copy of the resource, at which point a true private copy is created to prevent the changes becoming visible to everyone else. All of this happens transparently to the callers. The primary advantage is that if a caller never makes any modifications, no private copy need ever be created.

Using a shared page when ballooning provides a simple mechanism to check for the need to reset a balloon application by checking for writes to the balloon page only when performing a write to the shared page. If the write to the shared page is not for a balloon page, then a COW operation takes place and a new machine page is assigned to the process performing the write. If the write is to a balloon page then the balloon application is reset (for reasons discussed further below). By backing balloon pages with the shared page, a read operation on the balloon page will not fail because the read will return the appropriate data in the shared page. This solves the problem with processes trying to read random memory in the VM. More details on resetting the balloon application are given below in reference to FIGS. 5-8.

In an alternative embodiment, the backing of the balloon page is done on-demand. This means that initially the balloon page is flagged with an invalid mapping (INVALID_MPN.) If a read takes place on the balloon page, then the mapping of the GPP is changed from the invalid mapping to a shared-page mapping. In another embodiment, the mapping to the shared page is performed immediately (e.g., by resource scheduler 120) when the balloon application allocates a GPP as a balloon page. It should be noted that any page of memory can be used as the shared page, and the zero page is just one instance of the shared page used for ballooning. In one embodiment, if the page to be ballooned is already backed by an existing page of machine memory, the existing page of machine memory can be used as the shared page and the mapping can be maintained. The flag or bit that indicates that this is a ballooned page would be the only change needed to add this page to the balloon set.

Using the zero-page as the shared page for ballooning has several advantages. First, if a MPN is released by the balloon application (e.g., due to a reboot of the guest OS, etc.), the MPN may be reallocated for another use. In so doing, the guest may desire to initialize the page by filling it with zeros. By using the shared zero-page, this initialization can be quickly performed by mapping the page to the shared zero page without having to actually fill a page of memory with zeroes (or the mapping may be automatically achieved because the MPN was already mapped to the zero-page when it was previously allocated to the balloon application). One exemplary technique for performing such zero-page mapping is described in U.S. patent application Ser. No. 12/246,402, filed Oct. 6, 2008, and entitled "System And Method For Maintaining Memory Page Sharing In A Virtual Environment," which is hereby incorporated by reference. Second, once backed by the appropriate shared page, a MPN can be ballooned within a guest without the VMM needing to communicate with the underlying resource scheduler because the underlying mapping is already correct. This is especially useful when backing with the shared zero-page since this is the most common kind of shared page in a guest.

Third, if a guest physical page being "ballooned" is already mapped to the zero page, in one embodiment, all that is needed to perform the balloon operation is to change a bit in the page table indicating that the guest physical page is a balloon page. This scenario of a guest physical page to be "ballooned" being already mapped to the zero page is not uncommon For example, if the size of the balloon's set of guest physical pages in a VM fluctuates, i.e., the number of pages being ballooned increases and decreases over time, it is possible that a previously ballooned page is released. One way to release the guest physical page is to clear the bit that indicates that it is a balloon page and then return the guest physical page back to the guest OS in the VM. If the page has not been changed yet, the returned balloon page may already be mapped to the zero page because it was previously part of the balloon set. This makes the fluctuation in the size of the balloon set easy to handle and without a high resource cost. Additionally, if a guest physical page to be ballooned is currently backed by any shared page, not necessarily the zero page, one embodiment leaves the mapping intact and simply marks the page as part of the set of ballooned pages.

Figure 5:
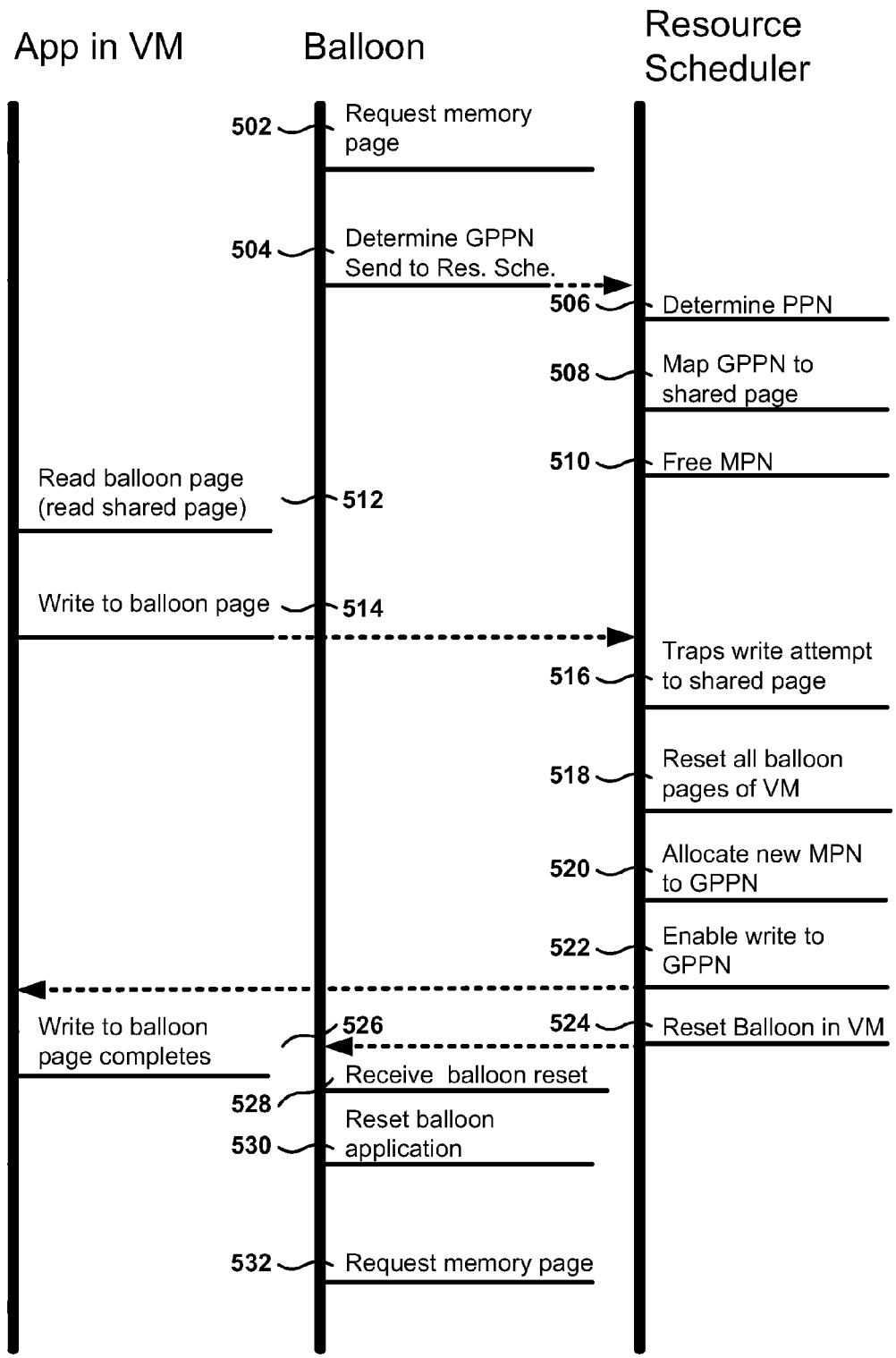
FIG. 5 illustrates some of the interactions between a balloon application and the resource scheduler, according to one embodiment.

FIG. 5 illustrates some of the interactions between the balloon application and the resource scheduler, according to one embodiment. Ballooning a page of memory from the VM begins in operation 502 where the balloon application requests a guest physical page of memory from the guest OS. Once the balloon application gets the guest physical memory page, the balloon application determines the GPPN associated 504 with the page and sends the resource scheduler the GPPN of the page to be ballooned.

After receiving the GPPN from the balloon application, the resource scheduler determines 508 the MPN in the host that is mapped to the GPPN, and then proceeds to free 510 the MPN for other use in the host. The resource scheduler then maps the GPPN to a shared zero-page. When an application in the VM performs a read 512 in the shared page, the read is performed on the shared page, as previously described. The resource scheduler is not involved with this routine memory read because the shared page is a readable page of machine memory. However, if an application in the VM performs a write 514 to the balloon page, the resource scheduler traps 516 this operation as writes to the shared page need to be checked to determine if a balloon page is involved. Also, the trap occurs because the shared page is write protected. A write to the shared page causes that particular mapping to be broken because in order to execute the write a writeable page is required and the shared page is not writeable. In one embodiment, an invoked copy-on-write (COW) technique allocates a new writeable physical page to the GPPN performing the write 520.

If the resource scheduler determines that the write to the shared page is to a balloon page, then the resource scheduler begins the process of resetting all balloon pages in the VM 518 by first clearing the balloon bits in the page table for any GPPs that have been marked as balloon pages and then re-mapping the GPP receiving the write from the zero-page to new writable MP. The pages with the cleared balloon bit are not considered balloon page. After operation 520, the write to the GPPN is enabled 522 because the GPPN is now mapped to a new writeable MP. The write to the balloon page by the application in the VM then completes 526 after the write is enabled by the resource scheduler.

Then, the resource scheduler sends the balloon application a command to reset. In another embodiment, the balloon application (or its corresponding driver) polls the resource scheduler periodically to check for messages or commands from the resource scheduler, such as the reset balloon command. In one implementation, the resource scheduler is polled once per second, but other frequencies are also possible. When the balloon application receives the reset command 528 from the resource scheduler, the balloon application resets 530 its list of balloon pages by clearing the list. Ballooning starts over in operation 532 when the balloon application requests a page of guest physical memory.

Figure 6:
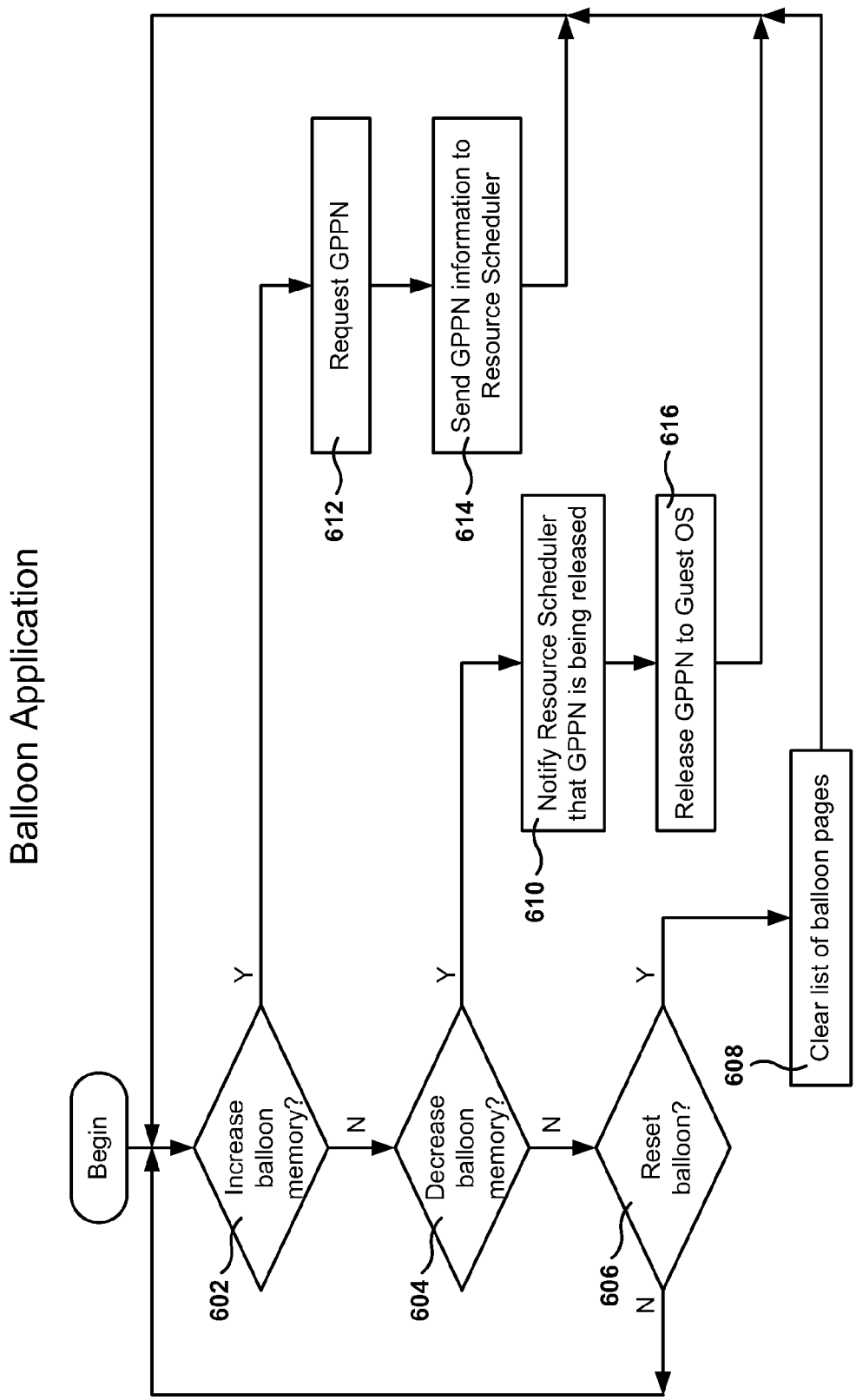
FIG. 6 shows the flow of an algorithm for a balloon application, in accordance with one embodiment.

FIG. 6 shows the flow of an algorithm for a balloon application, in accordance with one embodiment. FIG. 6 shows a simplified flowchart for some of the operations performed by the balloon application executing in the guest. It should be appreciated that the embodiments illustrated in FIG. 6 are exemplary representation of some of the balloon operations. Other embodiments may utilize different operations or the operations may be performed by other implementations of a balloon application, such as a balloon driver residing in the guest OS. The embodiments illustrated in FIG. 6 should therefore not be interpreted to be exclusive or limiting, but rather exemplary or illustrative. The balloon application executing as an application in the VM (see for example balloon application 108 in FIG. 1) can detect a request for increasing balloon memory 602, for decreasing balloon memory 604, or for resetting the balloon application 606.

If a request to increase balloon memory is detected in operation 602, the method flows to operation 612 where the balloon application requests memory from the guest OS. In one embodiment, the amount of memory requested is one page of memory (GPPN), but other amounts of memory are also possible. Once the balloon application obtains the GPPN, the balloon application sends the information associated with the GPPN (such as the memory address of the GPPN) to the resource scheduler in order to have the resource scheduler free the currently mapped machine memory page of the GPPN for use by other processes in the host.

When a request to decrease balloon memory is detected in operation 604, the method flows to operation 610 where the balloon application notifies the resource scheduler the GPPN that is being released back to the guest OS. In one embodiment, the resource scheduler tells the balloon application which guest physical page to release, and in this case the balloon application does not need to notify the resource scheduler since the resource scheduler is already aware of which page is being released. In some cases, the balloon application notifies the resource scheduler after the guest physical page has been released, but in other cases the resource scheduler is not notified. After operation 610, the method flows to operation 616 where the balloon application releases the guest physical memory page of memory back to the guest OS. It should be noted that some of the operations may be performed in a different order. For example, operation 616 can be performed before operation 610, or both operations 610 and 616 can be initiated simultaneously.

If the balloon application detects a request to reset the balloon application, the method flows to operation 608, where the balloon application clears all information about the list of balloon pages. In one embodiment, the reset command implies that the resource scheduler has already taken care of the balloon pages and that the balloon pages may have already been assigned to other applications in the VM because of an unexpected scenario, such as a reboot of the guest OS. In this case, the balloon application simply clears the list of balloon pages and the balloon application continues normal operation until a new request for balloon memory is received. In another embodiment, the balloon application checks with the guest OS to see which pages of memory are owned by the balloon application. The balloon application then proceeds to release all the pages of memory owned by the balloon application. It should be recognized that resetting the balloon application may change according to the actual implementation of memory management using ballooning. The principle to consider when resetting the balloon application is to release those pages of memory owned by the balloon application, if any.

Figure 7:
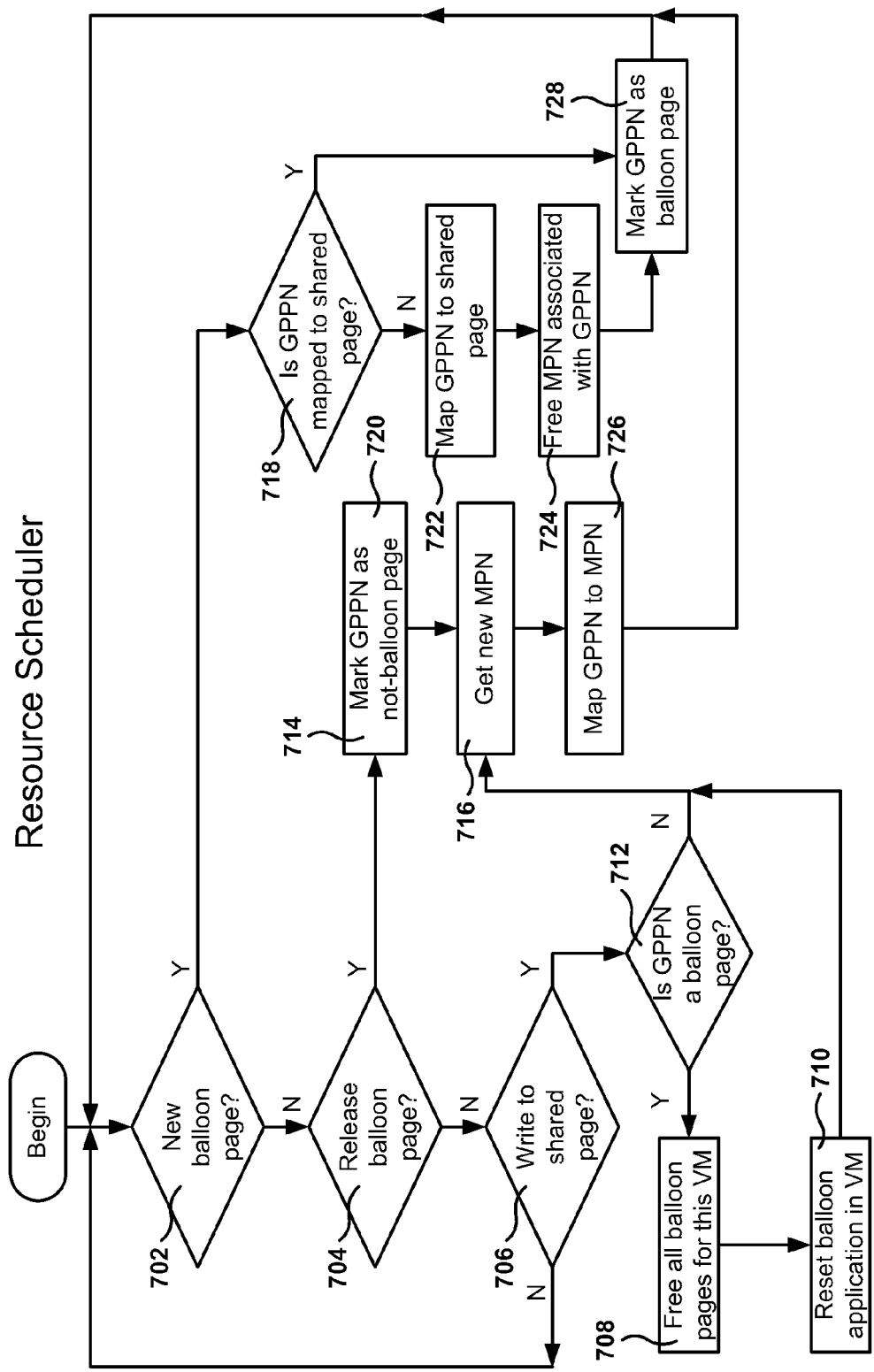
FIG. 7 shows the flow of an algorithm for a resource scheduler, in accordance with one embodiment.

FIG. 7 shows the flow of an algorithm for a resource scheduler, in accordance with one embodiment of the invention. FIG. 7 illustrates some of the operations performed by the resource scheduler that relate to ballooning operations. The resource scheduler can detect a new balloon page 702, a release of a balloon page 704, or a write to the shared page 706.

If information about a new balloon page is detected 702, the method flows to operation 718 where the resource scheduler checks to see if the machine memory page associated with the balloon page (GPPN) is already mapped to the shared page (e.g., the zero page). If the GPPN is already mapped to the shared page, all the resource scheduler has to do is to mark the GPPN as a balloon page, for example by flipping a bit that indicates whether the GPPN is a balloon page. If the GPPN is not already mapped to the shared page, the method flows to operation 722 where the resource scheduler maps the GPPN to the shared page and then frees the machine memory page (MPN) associated with the GPPN 724. The method then continues to operation 728 to mark the GPPN as a balloon page.

When the resource scheduler detects the release of a balloon page (for example, when the balloon application returns memory to the guest OS), the method flows to operation 714 where the GPPN is marked as not being a balloon page anymore. From operation 714 the method proceeds to operation 716 where a new MPN is obtained from the host, and in operation 726 the GPPN is mapped to the new MPN to complete the release of the balloon page. In another embodiment, operations 716 and 726 are not performed at this time and the method flows back to the beginning from operation 714. In this case, the new MPN will be obtained when the process that obtains the GPPN does a write to the page, which will cause a write to the shared page causing the COW procedure (operations 716 and 726) at that time. This makes it very efficient to release a balloon page because all the resource scheduler has to do is to flip the bit that indicates that the page is a balloon page.

If the resource scheduler detects (or traps) a write to the shared page 706, then the resource scheduler next checks 712 if the GPPN being written into is a balloon page. If the GPPN is not a balloon page then the method performs the COW procedure (operations 716 and 726), as previously described. However, if the GPPN is a balloon page the resource scheduler assumes that an unexpected condition has taken place, as previously described (for example by a reboot of the guest OS). In this case, the method flows to operation 708 where the resource scheduler frees all the balloon pages for the VM that owns the GPPN. To free all the pages, the resource scheduler iterates through all the pages that were in the current balloon set, and for each guest physical page the resource scheduler clears the balloon status of the page to indicate that the page is no longer a balloon page. When the VM accesses any of these pages, the resource scheduler backs the page with an actual page of machine memory. At this point, ballooning operations start over again.

After operation 708, the resource scheduler sends a reset command 710 to the balloon application in the VM to let the balloon application know that ballooning has been restarted. The balloon application will in turn release all memory held, if any, and will start ballooning again. Details for resetting the balloon application are given above in reference to FIG. 6. After resetting the balloon in operation 710, the method flows to operation 716 to perform the COW procedure on the GPPN page, as described above. In one embodiment, operation 710 is performed before operation 708, which is followed by operation 716.

It should be noted that the methods described herein for resetting a balloon application assume that the write to the balloon page is created by an unexpected write to the balloon page. Under a different scenario, a write to a balloon page can take place because the GVPN has been moved to virtual storage and the GPPN has been assigned by the guest OS to a different application in the VM (assuming that the balloon page has not been locked in by the guest OS by the balloon driver). In this case, the hypervisor or the resource scheduler will detect this condition and will react accordingly by marking the GPPN as not a balloon page anymore, without resetting the balloon application. More details on the effects of moving a page to virtual memory can be found in U.S. application Ser. No. 11/525,561, filed on Sep. 21, 2006, and entitled "Determining Memory Conditions In A Virtual Machine."

Figure 8:
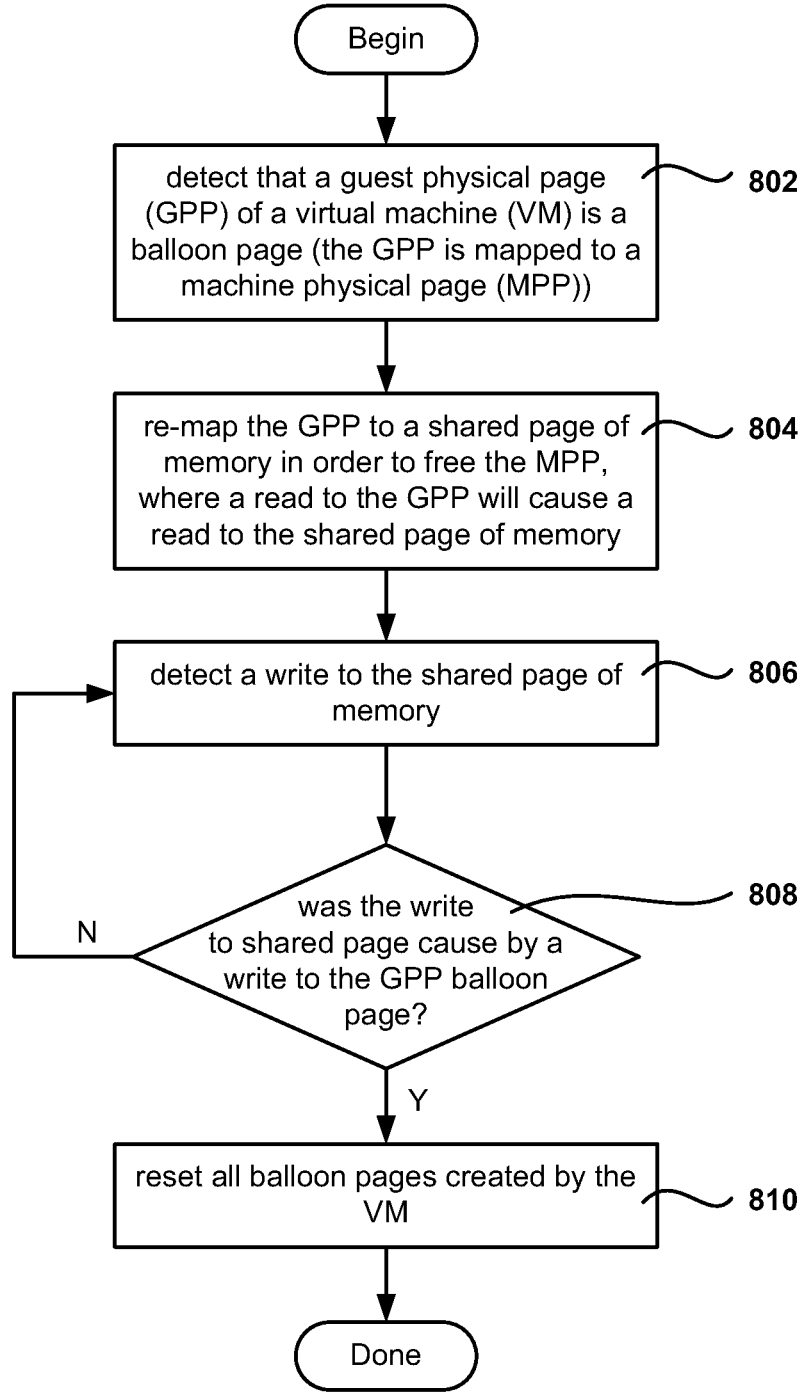
FIG. 8 shows the flow of an algorithm for managing machine memory in a host of a virtual infrastructure, in accordance with one embodiment.

FIG. 8 shows the flow of an algorithm for managing machine memory in a host of a virtual infrastructure, in accordance with one embodiment of the invention. The method includes operation 802 for detecting that a GPP, which is mapped to an MP, is a balloon page. After operation 802, the method flows to operation 804 for re-mapping the GPP to a shared page of machine memory in order to free the MP. As a result, a read to the GPP will cause a read to the shared page of memory because the GPP is now mapped to the shared page of machine memory. This way, unexpected reads to the balloon page will not cause an error condition and the read will successfully complete by reading from the shared page.

After operation 804, the method flows to operation 806 to detect a write to the shared page of memory some time after the re-mapping of the GPP. In operation 808, the method checks if the write to the shared page was caused by a write to the GPP balloon page, and if the check is positive the method flows to operation 810, or to operation 806 otherwise. In operation 810, the method resets all balloon pages created by the VM.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. The machines can also be virtualized to provide physical access to storage and processing power to one or more users, servers, or clients. Thus, the virtualized system should be considered a machine that can operate as one or more general purpose machines or be configured as a special purpose machine. Each machine, or virtual representation of a machine, can transform data from one state or thing to another, and can also process data, save data to storage, display the result, or communicate the result to another machine.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for managing machine memory in a host of a virtual infrastructure, the method comprising:
   detecting that a guest physical page (GPP) of a virtual machine (VM) is a balloon page, the GPP being mapped to a machine page (MP);
   re-mapping the GPP to a shared page of memory in order to free the MP, wherein a read to the GPP causes a read to the shared page of memory;
   detecting a write to the shared page of memory after the re-mapping, the write to the shared page caused by a write to the GPP; and
   resetting all balloon pages created by the VM when the write to the shared page is detected.

2. The method as recited in claim 1, wherein resetting all balloon pages further includes:
   determining the GPPs of the VM that are balloon pages; and
   for each GPP balloon page that was determined, marking each GPP balloon page as a non-balloon page.

3. The method as recited in claim 2, wherein marking each GPP balloon page further includes changing a value of a balloon bit associated with the each page, wherein a subsequent write to each GPP balloon page will not cause the resetting of all balloon pages for the VM.

4. The method as recited in claim 3, further including:
   identifying a write operation to the shared page caused by a write to a GPP that is not a balloon page;
   allocating a new MP to the GPP that is not a balloon page; and
   copying the shared page into the new MP before performing the write to the shared page.

5. The method as recited in claim 1, wherein detecting the write to the shared page further includes:
   trapping writes to the shared page; and
   checking if a write to the shared page is caused by a balloon page when a trap occurs due to a write to the shared page.

6. The method as recited in claim 1, further including:
   sending a command to a balloon application executing in the VM to reset the balloon pages reserved by the balloon application.

7. The method as recited in claim 1, wherein re-mapping the GPP further includes:
   mapping the GPP to the shared page in response to detecting that the GPP is a balloon page.

8. The method as recited in claim 1, wherein re-mapping the GPP further includes:
   mapping the GPP with a special identifier to indicate that the GPP is not mapped to any MP; and
   mapping the GPP to the shared page when detecting a read to the GPP.

9. The method as recited in claim 1, wherein the shared page is a zero page filled with words having a 0 value.

10. The method as recited in claim 1, wherein the method operations are performed by a computer program when executed by one or more processors, the computer program being embedded in a non-transitory computer-readable storage medium.

11. The method as recited in claim 1, wherein the re-mapping step recognizes if the GPP is already mapped to a shared page and does not execute a re-mapping.

12. The method as recited in claim 1, wherein more than one shared page of memory is used for balloon pages.

13. A system for managing machine memory in a host of a virtual infrastructure, the system comprising:
   machine memory in the host, the machine memory including machine pages (MP);
   a balloon application executing in a virtual machine (VM), the balloon application obtaining guest physical pages (GPP) from the operating system (OS) executing in the VM; and
   a resource scheduler in the host, wherein the resource scheduler performs operations of,
      detecting GPPs reserved by the balloon application that are balloon pages, the GPPs being mapped to corresponding MPs;
      re-mapping each balloon page that was detected to a shared page of memory in order to free the corresponding MPs, wherein a read to any balloon page causes a read to the shared page of memory;
      detecting a write to the shared page of memory after the re-mapping, the write to the shared page caused by a write to a balloon page; and
      resetting all the balloon pages when the write to the shared page is detected.

14. The system of claim 13, further including:
   a balloon driver installed in the guest operating system of the VM, the balloon driver facilitating communication between the balloon application and the resource scheduler.

15. The system of claim 13, wherein re-mapping each balloon page further includes:
   checking each balloon page to determine if each balloon page is mapped to the shared page;
   mapping each balloon page to the shared page when the checking determines that the each balloon page is not mapped to the shared page.

16. The system of claim 15, wherein re-mapping each balloon page further includes:
   freeing the MP associated with the each balloon page when the checking determines that the each balloon page is not mapped to the shared page.

17. The system of claim 13, further including:
   an application executing in the VM, wherein a write to a balloon page by the application causes the resetting of all the balloon pages.

18. A method for managing machine memory in a host of a virtual infrastructure, the method comprising:
   detecting that a guest physical page (GPP) of a virtual machine (VM) is a balloon page, the GPP being mapped to a machine page (MP);
   mapping the GPP with a special identifier to indicate that the GPP is not mapped to any MP;
   re-mapping the GPP to a shared page of memory upon detecting a read to the GPP if the GPP is not mapped to the shared page, wherein the read to the GPP causes a read to the shared page of memory;
   detecting a write to the shared page of memory caused by a write to the GPP; and
   resetting all balloon pages created by the VM when the write to the shared page is detected.

19. The method as recited in claim 18, wherein resetting all balloon pages further includes:
   determining the GPPs of the VM that are balloon pages; and
   for each GPP balloon page that was determined, marking each GPP balloon page as a non-balloon page.

20. The method as recited in claim 19, wherein marking each GPP balloon page further includes changing a value of a balloon bit associated with the each page, wherein a subsequent write to the each GPP balloon page will not cause the resetting of all balloon pages for the VM.

21. The method as recited in claim 20, further including:
   identifying a write operation to the shared page caused by a write to a GPP that is not a balloon page;
   allocating a new MP to the GPP that is not a balloon page; and
   copying the shared page into the new MP before performing the write to the shared page.

22. The method as recited in claim 18, wherein the method operations are performed by a computer program when executed by one or more processors, the computer program being embedded in a non-transitory computer-readable storage medium.

23. The method as recited in claim 18, wherein more than one shared page of memory is used for balloon pages.

* * * * *